United States Patent
Kim

(10) Patent No.: US 9,593,389 B2
(45) Date of Patent: Mar. 14, 2017

(54) STEEL WIRE ROD FOR BEARING STEEL, MANUFACTURING METHOD OF STEEL WIRE ROD FOR BEARING STEEL, HEAT TREATMENT METHOD OF STEEL BEARING, STEEL BEARING AND SOAKING METHOD OF BEARING STEEL

(75) Inventor: Kwan-Ho Kim, Pohang (KR)

(73) Assignee: POSCO, Pohang (KR)

( * ) Notice: Subject to any disclaimer, the term of this patent is extended or adjusted under 35 U.S.C. 154(b) by 463 days.

(21) Appl. No.: 12/747,032

(22) PCT Filed: Dec. 12, 2008

(86) PCT No.: PCT/KR2008/007356
§ 371 (c)(1),
(2), (4) Date: Jun. 9, 2010

(87) PCT Pub. No.: WO2009/082107
PCT Pub. Date: Jul. 2, 2009

(65) Prior Publication Data
US 2010/0263771 A1    Oct. 21, 2010

(30) Foreign Application Priority Data

Dec. 20, 2007  (KR) .................. 10-2007-0134271
Dec. 20, 2007  (KR) .................. 10-2007-0134273
Sep. 5, 2008   (KR) .................. 10-2008-0087772

(51) Int. Cl.
| | | |
|---|---|---|
| *C21D 1/19* | (2006.01) | |
| *C21D 1/32* | (2006.01) | |
| *C21D 9/00* | (2006.01) | |
| *C21D 9/38* | (2006.01) | |
| *C21D 9/40* | (2006.01) | |
| *C22C 38/02* | (2006.01) | |
| *C22C 38/04* | (2006.01) | |
| *C22C 38/34* | (2006.01) | |
| *F16C 33/62* | (2006.01) | |
| *F16C 33/64* | (2006.01) | |

(52) U.S. Cl.
CPC .............. *C21D 1/19* (2013.01); *C21D 1/32* (2013.01); *C21D 9/0075* (2013.01); *C21D 9/38* (2013.01); *C21D 9/40* (2013.01); *C22C 38/02* (2013.01); *C22C 38/04* (2013.01); *C22C 38/34* (2013.01); *F16C 33/62* (2013.01); *F16C 33/64* (2013.01); *C21D 2211/001* (2013.01); *C21D 2211/008* (2013.01)

(58) Field of Classification Search
CPC .......... C21D 1/19; C21D 1/32; C21D 9/0075; C21D 9/38; C21D 9/40; C21D 2211/001; C21D 2211/008; C22C 38/02; C22C 38/04; C22C 38/16; C22C 38/34; F16C 33/62; F16C 33/64
USPC .............. 148/320, 332, 333, 336, 595, 660; 420/89, 99, 104, 117, 119
See application file for complete search history.

(56) References Cited

U.S. PATENT DOCUMENTS

| | | | |
|---|---|---|---|
| 6,162,390 A * | 12/2000 | Bellus et al. ................ | 420/100 |
| 6,423,158 B1 | 7/2002 | Maeda et al. | |
| 2002/0066502 A1 | 6/2002 | Tako et al. | |
| 2006/0011274 A1 | 1/2006 | Speer et al. | |

FOREIGN PATENT DOCUMENTS

| | | |
|---|---|---|
| EP | 1048744 A1 | 11/2000 |
| FR | 2781813 A1 | 2/2000 |
| JP | 03162550 A | 7/1991 |
| JP | 3254342 A | 11/1991 |
| JP | 04-365816 | 12/1992 |
| JP | 2000234145 A | 8/2000 |
| JP | 2001-519853 A | 10/2001 |
| JP | 2001294972 A | 10/2001 |
| JP | 2002-115030 A | 4/2002 |
| JP | 2004-100016 | 4/2004 |
| JP | 2005113215 A | 4/2005 |
| JP | 2005154889 A | 6/2005 |
| JP | 2005337362 A | 12/2005 |
| JP | 2006045591 A | 2/2006 |
| JP | 2007-224410 | 9/2007 |
| WO | 98/45495 A1 | 10/1998 |
| WO | 0028100 A1 | 5/2000 |
| WO | 2004022794 A1 | 3/2004 |

OTHER PUBLICATIONS

Sakaguchi et al., English machine translation of JP 2005-337362, Dec. 8, 2005, whole document.*
Sekino et al., English machine translation of JP 2006-045591, Feb. 16, 2006, whole document.*
Edmonds D V et al: "Quenching and partitioning martensite—A novel steel heat treatment", Materials Science and Engineering A: Structural Materials: Properties, Microstructure&Processing, Lausanne, CH, vol. 438-440, Nov. 25, 2006(Nov. 25, 2006), pp. 25-34, XP027953091.

* cited by examiner

*Primary Examiner* — Roy King
*Assistant Examiner* — Caitlin Kiechle
(74) *Attorney, Agent, or Firm* — The Webb Law Firm

(57) ABSTRACT

A heat treatment method of manufacturing high carbon bearing steel having excellent abrasion resistance and fatigue resistance, a steel wire rod for high carbon bearing steel subjected to the heat treatment, a manufacturing method of the steel wire rod, high carbon bearing steel manufactured by the heat treatment and a soaking method of a steel bloom used for manufacturing the steel wire rod. The heat treatment method of bearings includes the steps of: quenching a bearing-shaped steel part containing, by weight, 0.5% to 1.20% carbon and 1.0% to 2.0% silicon; and partitioning the quenched steel part at a temperature ranging from $M_s-100°$ C. to $M_s$ for at least 10 minutes, where $M_s$ represents a temperature at which formation of martensite will start.

5 Claims, 7 Drawing Sheets

STEEL WIRE ROD FOR BEARING STEEL, MANUFACTURING METHOD OF STEEL WIRE ROD FOR BEARING STEEL, HEAT TREATMENT METHOD OF STEEL BEARING, STEEL BEARING AND SOAKING METHOD OF BEARING STEEL

TECHNICAL FIELD

The present invention relates to a steel wire rod for bearings, a manufacturing method of the steel wire rod, a bearing, a heat treatment method of bearings and a soaking method of a steel bloom for bearings. More particularly, the present invention relates to a heat treatment method of manufacturing high carbon bearing steel having excellent abrasion resistance and fatigue resistance, a steel wire rod for high carbon bearing steel subjected to the heat treatment, a manufacturing method of the steel wire rod, high carbon bearing steel manufactured by the heat treatment and a soaking method of a steel bloom used for manufacturing the steel wire rod.

BACKGROUND ART

A bearing is a mechanical element that permits a shaft of a machine to rotate, fixes the rotating shaft in position, and supports the unladen weight of the shaft and a load applied to the shaft. When a rotating machine makes a number of turns per unit time, repetitive load in proportion to the turns is applied to a bearing that supports a rotating shaft. Since the repetitive load is applied, the bearing is required to have high resistance against fatigue fracture caused by the repetitive load as well as excellent abrasion resistance. A process of manufacturing the bearing includes the steps of properly controlling the composition of steel, which will be made into the bearing, forming a steel wire rod through steel-making, continuous casting and rolling, and machining the resultant steel wire rod into the bearings.

For the manufacturing of bearings, high-carbon chromium steel containing about 1.0 wt % carbon (C) and about 1.5 wt % chromium (Cr) has been mist widely used.

In general, the high-carbon Cr bearing steel is frequently manufactured into a bloom through converter, vacuum degassing (RH: Rheinstahl huttenwerke & Heraus) and continuous casting processes. The converter process includes a blowing process of converting molten iron into molten steel, and the vacuum degassing is carried out so as to decrease, as much as possible, total oxygen content that indicates inclusion content in the vacuum degassing process. The resultant bloom is subjected to soaking for relieving segregation and removing coarse carbide from the central portion of a bloom, followed by natural air cooling, and is then rolled into a billet, which is in turn formed into a wire rod via rolling.

A bearing is manufactured by machining the resultant wire rod into the shape of a transmitter of the bearing, such as balls or inner/outer wheels, through drawing and spheroidizing heat treatment, followed by hardening heat treatment for securing sufficient fatigue strength and abrasion resistance.

The typical hardening heat treatment on the bearing is carried out by a so-called QT process in which quenching is followed by tempering. The quenching rapidly cools down the bearing after heated to or above Ac3 temperature where steel is austenitized. By the quenching, the internal structure of steel is converted from austenite into hard martensite via diffusionless transformation. Although the martensite produced by the quenching is very hard, it cannot be directly used as the bearing due to poor toughness. Hence, the quenching is followed by the tempering for improving the toughness of the bearing. The tempering is a precipitation process for the martensite formed by the diffusionless transformation and is carried out by maintaining the bearing at a predetermined temperature such that carbon supersaturated in the martensite can precipitate as carbide so as to alleviate or remove residual stress caused by the quenching and to anneal hardened microstructures. As important features of the tempering, fine carbide precipitates in the martensite, and the martensite is converted into tempered martensite.

When produced by the above-described process, bearing steel has an internal structure composed of tempered martensite and carbide, and its surface hardness is about 60HRC or higher. Even if a bearing is heat-treated by the above QT process, its abrasion resistance and fatigue resistance are frequently insufficient when used in harsh conditions such as rolling contact.

This is because carbide formed in the tempered martensite has an adverse effect on the toughness of steel. This occurs when the internal structure of steel is formed close to 100% tempered martensite. Even if hardness is very high as described above, toughness and ductility are poor. Accordingly, the problem is that toughness and ductility are not sufficiently improved in the tempered martensite.

Furthermore, the QT process requiring at least 2 hours causes other problems such as increase in manufacturing costs and decrease in productivity.

The present invention has been made to solve the foregoing problems with the prior art. According to one or name aspects of the present invention, there is provided a steel wire rod for bearing steel, which can be advantageously manufactured into novel bearing steel by quenching and partitioning, such that the novel bearing steel has greatly improved toughness over those manufactured by conventional QT treatment.

According to one or more aspects of the present invention, there are provided a heat treatment method of novel bearing steel, which can have greatly improved toughness even with a shorter heat treatment time compared to conventional QT treatment, and a bearing manufactured by the same method.

According to one or more aspects of the present invention, there is provided a steel wire rod for bearings, which can be advantageously used for the manufacturing of the above-described bearing of the present invention.

According to one or more aspects of the present invention, there is provided a soaking method of a steel bloom, by which segregation in the steel bloom can be removed so as to advantageously provide the above-described bearing of the present invention.

SUMMARY OF THE INVENTION

According to an aspect of the present invention, the heat treatment method of bearings may include the steps of:

quenching a bearing-shaped steel part containing, by weight, 0.5% to 1.20% carbon and 1.0% to 2.0% silicon; and partitioning the quenched steel part at a temperature ranging from $M_s$–100° C. to $M_s$ for at least 10 minutes, where $M_s$ represents a temperature at which formation of martensite will start.

In an exemplary embodiment, the heat treatment method may further include maintaining the quenched steel part at quenched temperature for at least one minute between the quenching and the partitioning of the steel part.

Here, the bearing-shaped steel part may further contain at least one element selected from the group consisting of, by weight, 0.20% to 1.00% manganese, 1.30% to 1.60% chromium, up to 0.1% aluminum, up to 1.0% nickel and up to 1.0% copper.

The bearing-shaped steel part may contain, by weight, up to 0.025% phosphorus and up to 0.025% sulfur as impurities.

The maintaining of the quenched steel part can be carried out for 10 minutes or less.

The partitioning can be carried out for 30 minutes or less.

According to another aspect of the present invention, the bearing manufactured by the above-described heat treatment method may contain, by weight, 0.50% to 1.20% carbon and 1.0% to 2.0% silicon, and having an internal structure comprising martensite and retained austenite The bearing may further contain at least one element selected from the group consisting of, by weight, 0.20% to 1.00% manganese, 1.30% to 1.60% chromium, up to 0.1% aluminum, up to 1.0% nickel and up to 1.0% copper.

The retained austenite can have an area fraction from 5% to 15%.

Here, any type of carbide except for spheroidized carbide in the internal structure can be substantially excluded.

According to a further aspect of the present invention, the steel wire rod for bearings may contain, by weight, 0.50% to 1.20% carbon and 1.0% to 2.0% silicon.

The steel wire rod may further contain at least one element selected from the group consisting of, by weight, 0.20% to 1.00% manganese, 1.30% to 1.60% chromium, up to 0.1% aluminum, up to 1.0% nickel and up to 1.0% copper.

The steel wire rod may further contain, by weight, up to 0.025% phosphorus and up to 0.025% sulfur as impurities According to further another aspect of the present invention, the manufacturing method of a steel wire rod for bearings includes the steps of: soaking a bloom containing, by weight, 0.50% to 1.20% carbon and 1.0% to 2.0% silicon; rolling the soaked bloom; and cooling the rolled bloom, wherein the cooling can be carried out at a rate 1° C./sec or less.

The bloom may further contain at least one element selected from the group consisting of, by weight, 0.20% to 1.00% manganese, 1.30% to 1.60% chromium, up to 0.1% aluminum, up to 1.0% nickel and up to 1.0% copper.

According to yet another aspect of the present invention, the soaking method includes the steps of preparing a bloom for bearings comprising, by weight, 0.50% to 1.20% carbon and 1.0% to 2.0% silicon; and removing segregation in the bloom, wherein the soaking is carried out at a process temperature ranging from 1190° C. to 1250° C. and a process time of at least one hour.

Here, the bloom may further contain at least one element selected from the group consisting of, by weight, 0.20% to 1.00% manganese, 1.30% to 1.60% chromium, up to 0.1% aluminum, up to 1.0% nickel and up to 1.0% copper.

The bloom may further contain, by weight, up to 0.025% phosphorus and up to 0.025% sulfur as impurities.

It is preferable to carry out the soaking at the process time not exceeding six hours.

As set forth above, the present invention can remarkably improve the toughness of a bearing than the conventional QT heat treatment does so as to greatly improve abrasion resistance and fatigue resistance characteristics of the bearings.

BEST MODE FOR CARRYING OUT THE INVENTION

Hereinafter the present invention will be described in detail.

As a result of intensive efforts conducted to solve the foregoing problems of the related art, the inventors of the present invention found that it is necessary not only to form martensite as an internal structure but also to ensure a retained austenite structure in order to improve the toughness of bearings, and based on this finding, have devised the present invention.

However, according to the component system of a typical high-C chromium bearing, when the bearing is subjected to austenization and rapid cooling in order to form martensite, a sufficient amount of retained austenite fraction cannot be achieved in the bearing. Further, the retained austenite is also vulnerable to so-called transformation induced plasticity in which the retained austenite is transformed again into martensite due to load applied to the bearing in use. Finally, the bearing steel is composed of only tempered martensite and martensite structures.

In addition, since the transformation from retained austenite into martensite is accompanied by a change in dimensions, the dimension precision of the bearing is severely damaged by the transformation. This can cause a noise problem or rapidly accelerate fatigue fracture and abrasion of the bearing.

Thus, in the bearing steel, it is no less important to stabilize the retained austenite so that the retained austenite does not transform into the martensite even if stress is applied thereto than to form the retained austenite.

Accordingly, the inventors have concluded the following prerequisites for realizing the purpose of the present invention: The composition of bearing steel should be controlled to be different from those of conventional bearings and a novel method of Quenching-Partitioning (QP) should be applied in order to form retained austenite at a suitable fraction as well as stabilize the retained austenite.

Figure 1:
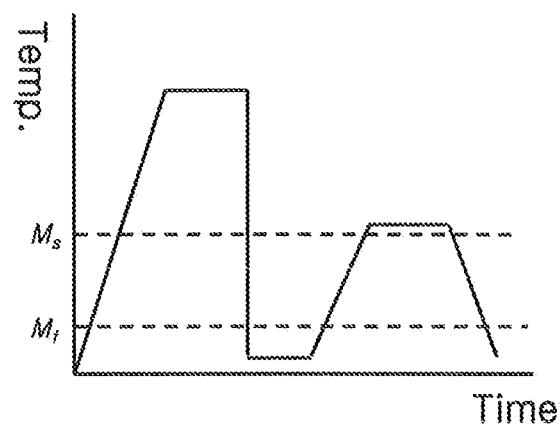
FIGS. 1(*a*) and (*b*) are graphs comparing quenching-tempering (QT) treatment (A) with quenching-partitioning (QP) treatment (B)
Figure 1:
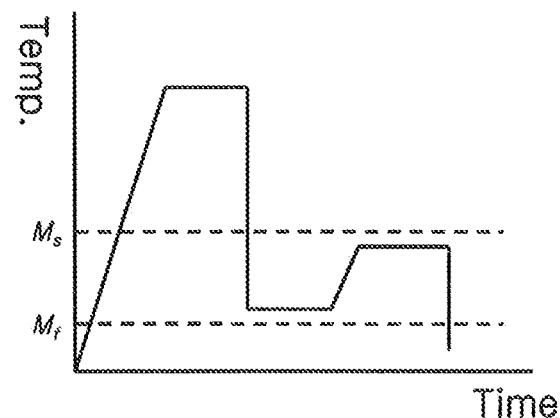

The QP treatment indicates quenching and partitioning, and was first proposed in International Publication No. WO2004/022794. The partitioning is a processing method in which quenched steel including martensite and retained austenite is heated and maintained at a low temperature such that carbon (C) in the martensite diffuses into the retained austenite to thereby further stabilize the retained austenite at the low temperature. FIG. 1 is a view comparing the QT treatment (a) with the QP treatment (b). In FIG. 1, $M_s$ represents the temperature at which the formation of martensite will start (hereinafter, referred to as "martensite start temperature"), and $M_f$ represents the temperature at which the formation of martensite will finish (hereinafter, referred to as "martensite finish temperature"). As can be seen from the drawing, the quenching temperature is more preferably between $M_s$ and $M_f$ since it is important to maintain the retained austenite by the QP process.

Accordingly, the partitioning forms the martensite, which contains substantially no carbide, and the stable retained austenite.

However, the QP treatment known in the art is not directly applicable to bearing steel. Since the bearing steel contains a large amount of C, even if the bearing steel is processed at a partitioning temperature, C will precipitate inside the martensite with high probability without diffusing into the retained austenite. This causes a problem in that the original purpose of stabilizing the retained austenite cannot be realized.

Therefore, it is necessary to change the composition of steel such that C can easily diffuse into the retained austenite in the partitioning to thereby stabilize the retained austenite. For this purpose, the inventors found that it is effective to set C content in steel to be in the range from 0.50 wt % to 1.20 wt % and change silicon content in steel to the range 1.0 wt % to 2.0 wt %, which is significantly higher than that contained in 100Cr6 (SAE52100=JIS-SUJ2) bearing, which has been widely used in the related art, in order to effectively diffuse C into the retained austenite in the partitioning.

Like C, silicon (Si) is an element in Group 4 of the periodic table and competes for atomic sites with C. Since C becomes thermodynamically unstable at a high Si content, it diffuses from martensite into retained austenite having higher solubility. As a result, the retained austenite is further stabilized to thereby obtain the effect that the present invention intends. Hereinafter the reasons why the contents of C and Si are limited as above will be described in name detail.

C: 0.50 to 1.20 Wt %

Carbon (C) is not only a very important element to secure the strength of a bearing but also essential to stabilize a retained austenitic structure according to the present invention. C content is preferably 0.50 wt % or name. At a lower C content, the bearing is not suitable for mechanical parts due to low strength and low fatigue strength. In contrast, the upper limit of the C content is set 1.20 wt %. At a higher C content, the presence of unsolved coarse carbide lowers fatigue strength and decreases workability when steel is not yet quenched. A name preferable content of the bearing steel can be divided from the above range into two patterns. One of the patterns is bearing steel having a C content ranging, by weight, from 0.95% to 1.05%, which is similar to that of high-C bearing steel classified as 100Cr6 (SAE52100=JIS-SUJ2) of the related art. The other one has a C content ranging from 0.5 to 0.7 by weight percent, which is similar to that of medium-C bearing steel.

Si: 1.0~2.0 Wt %

In order to enable partitioning, which was difficult to perform in conventional bearings as described above, Silicon (Si) is preferably added in an amount of 1.0 wt % or more. However, the amount of Si is also required not to exceed an upper limit 2.0 wt %. An excessive Si content may cause decarbonization due to site competition with C and decrease workability like C when steel is not yet quenched.

In the present invention, a bearing and a steel wire rod for manufacturing the bearing have a composition including, by weight, 0.5% to 1.20% C and 1.0% to 2.0% Si. Herein, the terminology "including" should be construed as an open limitation that includes the above-described elements but not excludes others. Those skilled in the art can "include" other elements in the steel composition by selecting the other elements from a variety of compositions and standardizations of conventional bearing steels and from the related art as set forth above in the background art.

As an instance, the bearing or steel wire rod may preferably include at least one of the following elements. Below, it will be described of the elements that can be added to the steel composition.

Mn: 0.20 to 1.00 Wt %

Manganese (Mn) is an important element to secure the strength of steel by improving hardenability. Mn is preferably contained in an amount of 0.20 wt % or name but not exceeding 1.00 wt % since an excessive amount of Mn decreases workability when steel is not yet quenched. In consideration of these reasons, Mn is name preferably added in an amount from 0.25 to 0.45 by weight percent.

Cr: 0.10 to 1.60 Wt %

Chromium (Cr) is an element that secures the strength of steel by improving hardenability and is effective for microstructural refinement of steel. Cr is added preferably in an amount of 0.10 wt % or name, and name preferably, in an amount of 1.30 wt % or name to maximize effects, but not exceeding 1.60 wt % since its effects are saturated at an excessive amount.

Al: 0.1 Wt % or Less

Aluminum (Al) can be included in steel since it is an element that serves as a strong oxidizing agent in steel production, has a steel-purifying effect, and refines grains by forming a compound with nitrogen in steel. However, Al content to be added is preferably 0.1 wt % or less since Al exceeding 0.1 wt % rather decreases the steel-purifying effect and fatigue lifetime. The lower limit of the Al content is not specifically defined since Al is not necessarily added.

Ni: 1.0 Wt % or Less

Nickel (Ni) is an element that improves the hardenability of steel and enhances the toughness of a quenched part, and is added in an upper limit 1.0 wt %. When copper (Cu) is added, the amount of Ni added is preferably half that of copper in order to avoid thermal embrittlement. The layer limit of the Ni content is not specifically defined since nickel is not necessarily added.

Cu: 1.0 Wt % or Less

Copper (Cu) is added for the effect of raising the hardness of a quenched part by improving hardenability, but in an amount not exceeding 1.0 wt % since its effect is saturated when added in an amount exceeding 1.0 wt %. The lower limit of the Cu content is not specifically defined either since Cu is not necessarily added.

In addition, impurities may be unavoidably included in bearings and/or in a manufacturing process thereof up to an amount that may not have an adverse effect on bearings. Those skilled in the art can manufacture a steel wire rod for bearings, in which impurity contents are controlled, and bearings from the steel wire rod by easily limiting the amount of the impurities and performing refinement according to a desirable range. Of the impurities, since phosphorous (P), sulfur (S), oxygen (Tot.O) and titanium (Ti) have relatively greater influences on the physical properties of bearings, and their contents will be specially described.

P: 0.025 Wt % or Less

Since phosphorous (P) is an element that decreases toughness when segregated in grain boundaries, P content can be positively limited. Regarding loads of steelmaking process etc., the P content is limited to an amount not exceeding 0.025 wt %, and preferably, not exceeding 0.02 wt %.

S: 0.025 Wt % or Less

While sulfur (S) acts to improve the machinability of steel, it adversely decreases toughness like P when segregated in grain boundaries and decreases fatigue lifetime by forming sulphide when bonded with Mn. Hence, it is preferable to limit the content of S. Regarding loads steelmaking process etc., the S content is limited to an amount not exceeding 0.025 wt %, and preferably, not exceeding 0.02 wt %.

O: 12 Ppm or Less

Oxygen (O) is an indicator of oxide inclusion and has an effect on fatigue strength. When the content of 0 in steel is high, a large amount of oxide inclusions are distributed to have an adverse effect of decreasing the fatigue strength of bearings. Preferably, O is included in an amount of 12 ppm or less based on Tot.O by an oxygen/nitrogen (0/N) analyzer.

Ti: 0.01 Wt % or Less

Titanium (Ti) decreases fatigue lifetime by forming coarse nitride when bonded with N. Preferably, the content of Ti is strictly limited to 0.01 wt % or less.

When the bearing steel of the present invention as described above is processed into bearings, followed by quenching and partitioning heat treatment, C is properly partitioned such that retained austenite in the steel are sufficiently stabilized. This as a result can advantageously overcome a problem of the related art, in which retained austenite would otherwise transform into martensite via transformation induced plasticity when bearings are used.

According to another aspect, the present invention includes procedures of austenitizing a bearing-shaped part having the above-described composition, quenching the bearing-shaped part, and then partitioning the bearing-shaped part by heat treatment. The quenching is similar to those well-known in the field of the present invention. The quenching has to be performed to quickly cool down the bearing-shaped part (water or oil cooling) to a temperature of martensite start temperature $M_s$ or under. The martensite start temperature $M_s$ can be expressed by the following Equation (1):

$$M_s(°\text{C.})=512-453C-16.9Ni+15Cr-9.5Mo+217(C)^2-71.5(C)(Mn)-67.6(C)(Cr) \quad \text{Equation (1)},$$

where C, Ni, Cr, Mo, Mn and so on indicate wt % of respective elements.

The following partitioning has to be determined by carefully considering compositional characteristics of the bearing steel of the present invention. In the present invention, it is necessary to promote the diffusion of C by Si through increasing Si content over that of typical bearings so that a large amount of C atoms existing in martensite can diffuse into retained austenite. Here, the partitioning temperature has to be defined since C may be distributed between a martensitic structure and a retained austenitic structure differently from the intention of the present invention so that the retained austenite is not positively stabilized if the partitioning temperature is not precisely controlled.

For reliable distribution of C, it is advantageous that Si maintains its site but C diffuses as being unstabilized by Si. In other words, it is preferable to prevent Si from diffusing but to allow C to diffuse. Here, the partitioning temperature is preferably in the range from $M_s-100°$ C. to $M_s$ since it is necessary to diffuse C as much as possible while keeping Si from diffusing. Meanwhile, since excessive diffusion time may be spent due to a slay diffusion rate of carbon when the temperature $M_s-100°$ C. is too low according to the composition of steel, the lower limit of the partitioning temperature is preferably set 100° C.

Therefore, the quenching-partitioning of the present invention is carried out by quenching the bearing-shaped part, followed by heating the part at a temperature between $M_s-100°$ C. and $M_s$, and then maintained at the same temperature for a predetermined time. Here, the partitioning time indicates a time period that is sufficient for the diffusion of C, and is not specifically limited in the present invention since those skilled in the art can easily determine a partitioning time without having to excessively repeat experiments. As an example, a time period of 10 minutes or name will be enough. Although it is not necessary to specifically limit the upper limit of the partitioning time, 30 minutes or less may be preferable in view of decrease in productivity.

Accordingly, the heat treatment method of bearings according to an aspect of the present invention includes quenching a bearing part, which is machined into the shape of a bearing with an advantageous composition of the present invention, and partitioning the quenched bearing part at a temperature ranging from $M_s-100°$ C. to $M_s$ for at least 10 minutes.

According to another aspect of the present invention, there is provided a unique process of quenching and partitioning, which is name suitable to the composition of alloy of the present invention.

As described above, the quenching is similar to a typical quenching process. However, the following partitioning is different from the disclosure of the above-described aspect of the present invention or International Publication No. WO2004/022794. Here, a name unique process is provided to ensure the hardness and toughness of bearing steel after heat treatment.

In other words, another aspect of the present invention does not perform heat treatment right after the quenching but requires a procedure of maintaining a quenched bearing for a predetermined time or name. As another characteristic, the present invention has a process of quenching, maintaining and partitioning steel. Herein, the term "maintaining" means maintaining a specimen at a quench stop temperature without heating the specimen.

According to the researches of the inventors, maintaining the quenched specimen is a very effective procedure to stabilize retained austenite. Since the specimen right after the quenching has a temperature difference between the surface and the central portion, structure inhomogeneity may occur when the specimen is heated right after the quenching. To prevent such an adverse effect, a predetermined maintaining time is necessary after the quenching. The maintaining time after the quenching is preferably one (1) minute or name. The upper limit of the maintaining time is not necessarily limited since continuing to maintain the specimen after the quenching does not cause a problem. Alternatively, the maintaining time can be set 30 minutes or less in terms of productivity since an excessive maintaining time may decrease productivity.

The maintaining of the bearing after the quenching is preferably followed by partitioning. As described above, the partitioning temperature is limited to the range from $M_s-100°$ C. to $M_s$. The partitioning temperature is preferably $M_s-100°$ C. or name since an intended effect of the partitioning is rarely obtainable when the partitioning temperature is too low. In the meantime, the lower limit of the partitioning temperature is name preferably 100° C. since excessive diffusion time may be spent due to a slow diffusion rate of carbon when the temperature $M_s-100°$ C. is too low according to the composition of steel. In contrast, excessively high partitioning temperature is not preferable either since tempering embrittlement may occur. In addition, back-diffusion of Si is also possible although the partitioning is required to diffuse only C into austenite area. Therefore, the partitioning temperature is preferably limited to a temperature of $M_s$ or less.

The partitioning can be performed preferably for at least 10 minutes in order to ensure a sufficient partitioning effect. A long partitioning time will not cause a particular problem since the partitioning is one-sided procedure of diffusing C solved in martensite toward retained austenite. Hence, it is not necessary to particularly set the upper limit of the partitioning time. Preferably, the partitioning time can be set 30 minutes or less since increasing the partitioning time may decrease productivity and the partitioning time exceeding 30 minutes does not provide a further significant effect. As such, the partitioning time is significantly shorter than that required in the tempering of the conventional QT process to thereby greatly contribute to increasing productivity.

Accordingly, the heat treatment method of bearings according to an aspect of the present invention includes quenching a bearing part, which is machined into the shape of a bearing with an advantageous composition of the present invention, maintaining the quenched bearing part for at least one minute, and partitioning the maintained bearing part at a temperature ranging from $M_s-100°$ C. to $M_s$ for at least 10 minutes.

While the bearing manufactured by the conventional QT process has an internal structure where tempered martensite and carbide are formed, the bearing manufactured by an aspect of the present invention has an internal structure where martensite and retained austenite exist.

In addition, the retained austenite in the bearing steel manufactured according to the present invention has an area fraction preferably from 5% to 15%. The area fraction is preferably 5% or more since the retained austenite is an essential structure to increase the toughness of the bearing as described above. When the fraction of the retained austenite is excessively high, the retained austenite may not be sufficiently stabilized since C diffuses in a dispersed state. As an adverse effect, part of the retained austenite may transform into martensite. This may severely damage the dimension precision such that the bearing can be damaged in use due to defective dimension precision. Accordingly, the upper limit of the fraction of the retained austenite is preferably set 15%.

In addition, the bearing of the present invention may have a structure in which carbide is substantially absent in martensite unlike the bearing manufactured by the conventional QT process. Alternatively, when a wire rod manufactured as described below is subjected to drawing and spheroidization, carbide can be formed in part of martensite by spheroidizing heat treatment. The bearing of the present invention can include this type of carbide. The carbide formed by the spheroidization has a grain size of about 0.5 µm or more but, preferably, not exceeding 2 µm. This type of carbide can be easily discriminated from ultra-fine carbide formed by the conventional quenching and tempering. Since the carbide formed by the conventional quenching and tempering is too fine, it can be observed using an electron microscope but cannot be observed by an optical microscope. In contrast, the carbide formed by the spheroidization is relatively coarse and thus is easily identifiable. The presence of the carbide formed by the spheroidization is acceptable since it does not have a significant adverse effect on toughness but rather increases abrasion resistance.

The bearing of the present invention having the above-described advantageous features is machined from a wire rod for bearing steel into the form of a bearing through drawing and spheroidization according to a typical method and is then provided to heat treatment. Therefore, the wire rod for bearings of the present invention is required to have the composition of bearing steel as described above, which is advantageous for stabilizing retained austenite by the partitioning of C in the quenching and partitioning. Particularly, the composition contains, by weight, 0.50% to 1.20% C and 1.0% to 2.0% Si. Other additional elements and impurities have been described already hereinbefore.

The wire rod for bearing steel can be preferably manufactured by a process of soaking and rolling a bloom to wire rod and annealing the wire rod, wherein the annealing is carried out at a very slow rate 1° C./sec or less such that the bloom has physical properties suitable to the following drawing and spheroidization. Due to the very slow annealing, the ductility of steel is improved to thereby facilitate drawing.

While the bloom provided for the manufacturing of a wire rod can be preferably soaked by internal segregation formed in casting, a soaking method for novel component systems was not proposed up to the present. Accordingly, a further aspect of the present invention provides a soaking method for the component systems, which will be described in detail as follows. Below, a description will be made of process temperature and time since they are especially important in the soaking.

Process Temperature: 1190 to 1250° C.

A process temperature of 1190° C. or higher is required to facilitate the diffusion of C into a component system of the present invention. A low process temperature is not preferable since coarse carbide in the central portion of a bloom will not be easily solved or diffused. In contrast, at an excessively-high process temperature, an unnecessarily-large amount of energy is consumed and decarbonization occurs in the surface of the bloom. Since the decarbonized part is not usable for a bearing due to poor hardness, hot scarfing is required to remove the decarbonized part. This however may cause problems such as increased process load and material loss. Accordingly, the upper limit of the process temperature is set 1250° C.

Process Time: 1 Hour or More

Process time is also a factor that has a great effect on the diffusion of segregated component. A process time of at least one hour is required to induce sufficient diffusion. More preferably, a process time of 1.5 hours or name is required. The upper limit of the process time is not specifically required since increasing the process time will not decrease soaking efficient. Preferably, the upper limit is set 6 hours in consideration of the decarbonization of material and process costs.

Accordingly, the soaking method of a bloom for bearings according to an aspect of the present invention has a process temperature ranging from 1190° C. to 1250° C. and a process time of at least one hour.

Hereinafter, the present invention will be described in more detail with respect to Examples. It should be understood, however, the following Examples will be provided by way of example but do not limit the scope of the present invention. Rather, the scope of the present invention shall be defined by the appended claims and equivalents thereof.

EXAMPLES

Observation of Effects of Bearing Composition

Bearing type parts having the composition as reported in Table 1 below were prepared in order to observe partitioning effects according to components. Any components which are not reported in the table can be included with a trace amount, which does not have a significant effect.

TABLE 1

| Samples | C | Si | Mn | P | S | Cr | O |
|---|---|---|---|---|---|---|---|
| CS[1] 1 | 0.99 | 0.25 | 0.34 | 0.009 | 0.008 | 1.47 | 0.0010 |
| IS[2] 1 | 1.00 | 1.04 | 0.35 | 0.012 | 0.008 | 1.53 | 0.0009 |
| IS 2 | 1.00 | 1.52 | 0.34 | 0.010 | 0.009 | 1.48 | 0.0008 |
| IS 3 | 0.98 | 1.71 | 0.35 | 0.009 | 0.010 | 1.46 | 0.0008 |
| IS 4 | 0.99 | 2.00 | 0.34 | 0.010 | 0.009 | 1.48 | 0.0010 |
| CS 2 | 0.55 | 0.25 | 0.80 | 0.007 | 0.011 | 0.15 | 0.0012 |
| IS 5 | 0.54 | 1.02 | 0.83 | 0.007 | 0.008 | 0.15 | 0.0011 |
| IS 6 | 0.55 | 1.51 | 0.82 | 0.008 | 0.010 | 0.14 | 0.0009 |
| IS 7 | 0.55 | 1.72 | 0.85 | 0.018 | 0.011 | 0.15 | 0.0011 |
| IS 8 | 0.56 | 2.00 | 0.85 | 0.007 | 0.009 | 0.14 | 0.0011 |

Note)
CS[1]Comparative Steel,
IS[2]Inventive Steel

Bearings were manufactured from Comparative Steel 1 and Inventive Steels 1 to 4, which have compositions of high-C steel bearings, by heating steel at 840° C. for 30 minutes, followed by rapidly cooling the steel to 70° C., which was maintained for 5 minutes, and then maintaining the steel at a temperature $M_s-10°$ C. for 10 minutes, where $M_s$ is derived from Equation 1 above. Quenching and tempering (QT) were also performed in order to compare the effect of QT treatment with that of quenching-partitioning (QP) treatment on the respective high-C bearings. The quenching was performed in the same way, but the tempering was carried out by heating at a raised temperature of 180° C., which was maintained for 30 minutes.

In addition, bearings were manufactured from Comparative Steel 2 and Inventive Steels 5 to 8, which have compositions of medium-C steel bearings, by heating steel at 900° C. for 30 minutes, followed by rapidly cooling the steel to 150° C., which was maintained for 10 minutes, and then maintaining the steel at 250° C. for 10 minutes. Quenching and tempering were also performed in order to compare the effect of QT treatment with that of QP treatment on the respective high-C bearings. The quenching was performed in the same way, but the tempering was carried out by heating at a raised temperature of 260° C., which was maintained for 30 minutes.

The hardness and retained austenite fraction of the bearings manufactured in the above-described process were measured and the results are reported in Table 2 below:

TABLE 2

| Samples | Hardness (HRC) | | Retained austenite fraction (%) | |
|---|---|---|---|---|
| Samples | QT | QP | QT | QP |
| CS[1] 1 | 60.1 | 60.4 | 0.87 | 2.62 |
| IS[2] 1 | 60.3 | 62.0 | 1.33 | 7.85 |
| IS 2 | 60.6 | 62.4 | 1.07 | 8.41 |
| IS 3 | 60.2 | 62.3 | 1.64 | 8.00 |
| IS 4 | 61.5 | 64.7 | 2.83 | 9.27 |
| CS 2 | 56.9 | 57.4 | 2.77 | 3.24 |
| IS 5 | 57.5 | 61.1 | 3.04 | 7.03 |
| IS 6 | 57.9 | 61.2 | 2.98 | 6.87 |
| IS 7 | 58.1 | 61.7 | 3.17 | 7.20 |
| IS 8 | 58.8 | 62.3 | 3.31 | 7.49 |

Note)
CS[1]Comparative Steel,
IS[2]Inventive Steel

From Table 1 above, it can be understood that retained austenite fractions were under 4% in Comparative Steels 1 and 2, which have a relatively lower Si content out of the range of the present invention, even after the quenching and partitioning (QP) treatment. This retained austenite fraction is lower than that of Inventive Steels, which is typically 6.87% or more. At the retained austenite fraction under 4%, a sufficient amount of C does not diffuse into retained austenite, and thus the bearings have poor toughness.

It can also be understood that each of Comparative Steels 1 and 2 has a lower hardness compared to a respective group of Inventive Steels 1 to 4 and Inventive Steels 5 to 8 when C contents are similar. This shays that a desirable level of hardness can be rarely obtained when Si content is not sufficient.

In addition, it can also be appreciated that the quenching and partitioning treatment caused much higher hardness and retained austenite fraction than the quenching and tempering treatment at the same composition.

Figure 2:
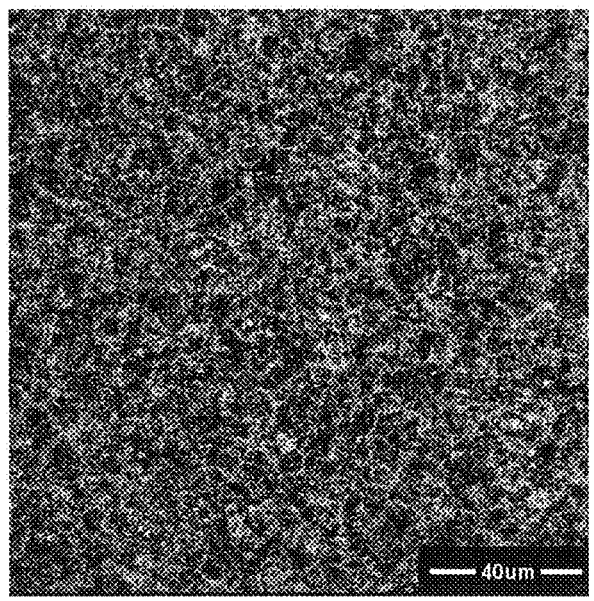
FIGS. 2(*a*) and (*b*) are micrographs showing structures of Inventive Steel 2 according to an embodiment of the present invention after qt treatment (A) and QP treatment (B)
Figure 2:
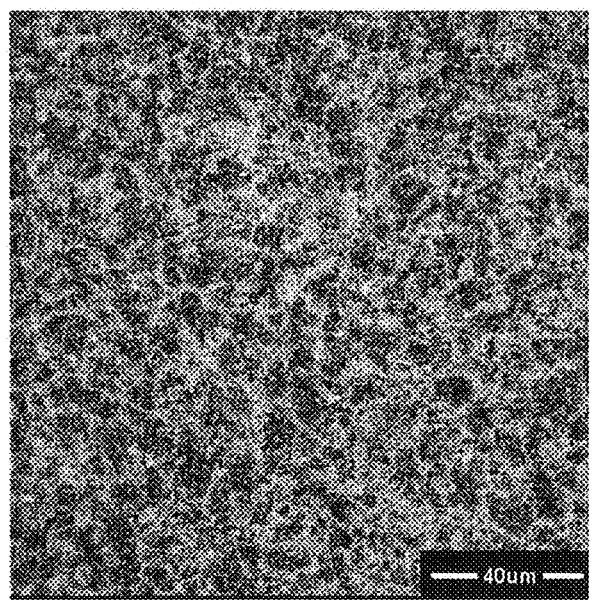
Figure 3A:
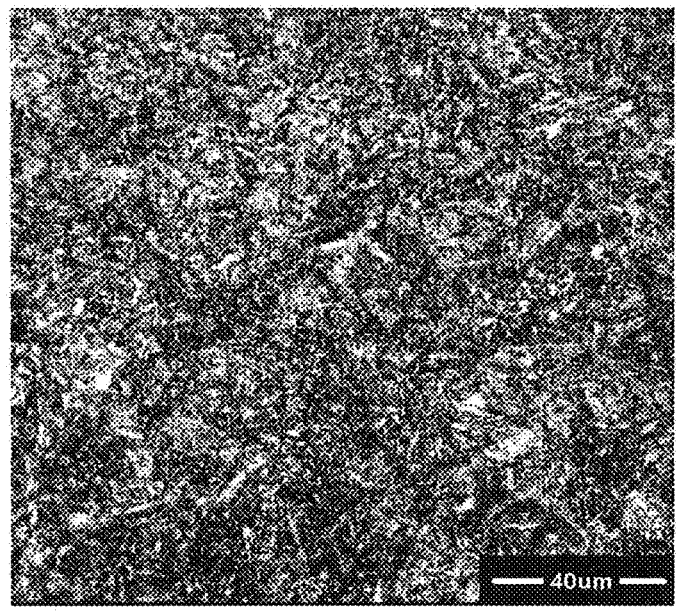
FIGS. 3 (*a*) and (*b*) are micrographs showing structures of Inventive Steel 7 according to an embodiment of the present invention after QT treatment (A) and QP treatment (B)
Figure 3B:
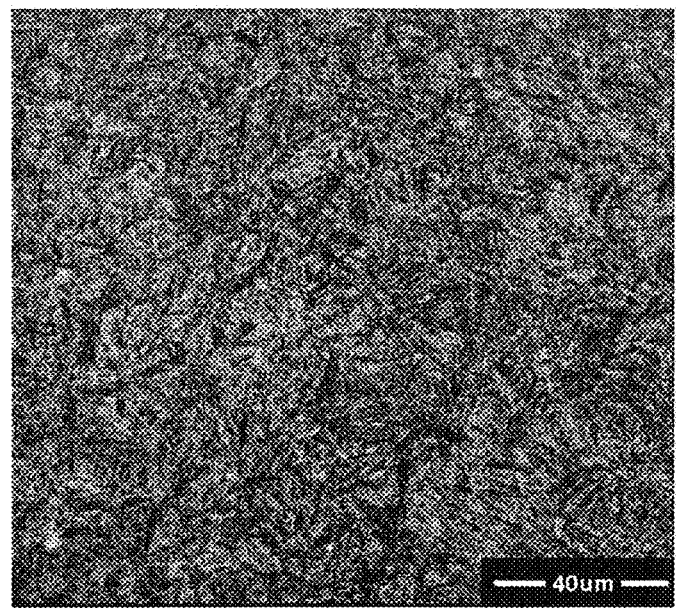
Figure 4:
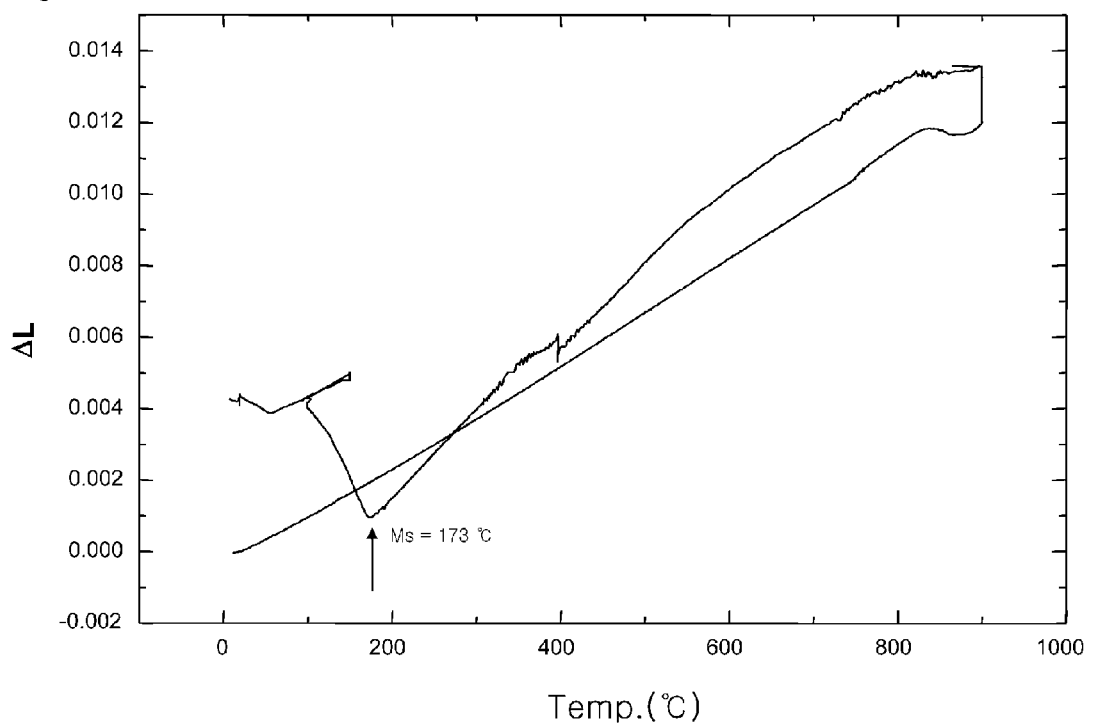
FIG. 4 is a graph showing the results of measuring martensite start temperatures of bearing parts used in an embodiment of the present invention.

FIGS. 2 and 3 compare the case in which Inventive Steels 2 and 7 were quenched and tempered (a) with the case in which Inventive Steels 2 and 7 were quenched and partitioned (b). As can be seen from the figures, the case (a) has significantly smaller retained austenite fractions than the case (b) has.

Observation of Effects of Hold Time After Quenching

Inventive Example

A steel wire rod having the following composition of Fe—0.972%C—1.71%Si—0.349%Mn—0.019%P—0.009%S—0.032%Al—1.46Cr—0.051Ni—0.009Cu—

The extracted specimens were subjected to soaking according to a variety of temperatures and hold times as reported in Table 3 below. The cross sections of the specimens were observed to check whether or not coarse carbide was completely removed, and the results are also reported in Table 3. In the following table, the mark "x" indicates the residue of coarse carbide, which was not completely removed, and the mark "○" indicates that coarse carbide was completely removed.

TABLE 3

|  | 1190° C. | 1200° C. | 1210° C. | 1225° C. | 1240° C. | 1250° C. |
|---|---|---|---|---|---|---|
| 0.5 hr | X | X | X | X | X | X |
| 1 hr | X | X | ○ | ○ | ○ | ○ |
| 1.5 hrs | ○ | ○ | ○ | ○ | ○ | ○ |
| 2 hrs | ○ | ○ | ○ | ○ | ○ | ○ |
| 3 hrs | ○ | ○ | ○ | ○ | ○ | ○ |
| 4 hrs | ○ | ○ | ○ | ○ | ○ | ○ |
| 5 hrs | ○ | ○ | ○ | ○ | ○ | ○ |
| 6 hrs | ○ | ○ | ○ | ○ | ○ | ○ |

0.005Ti—0.0009O(oxygen) was drawn, spheroidized, and then formed into the shape of bearings.

After heating at 840° C. for 30 minutes, quenching for obtaining a martensitic microstructure was performed by rapid cooling in oil having a temperature 100° C. under $M_s$. Next, the temperature was maintained for 5 minutes and then raised to 150° C., which was maintained for 10 minutes, thereby manufacturing a bearing of the present invention.

Conventional Example

A conventional bearing was manufactured by quenching in the same fashion as Inventive Example, followed by tempering at 180° C. for 1 hour.

Structure Comparison

Figure 5A:
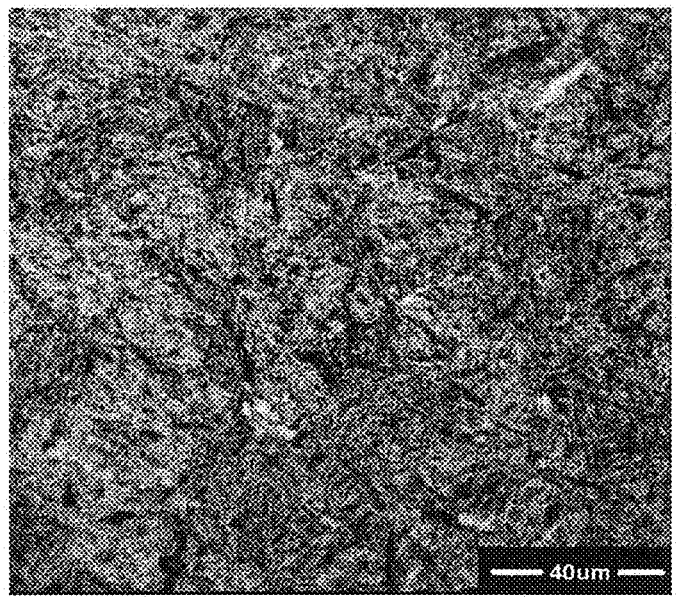
FIGS. 5(*a*) and (*b*) are micrographs showing a bearing manufactured according to a conventional example (A) and a bearing manufactured according to an inventive Example (B)
Figure 5B:
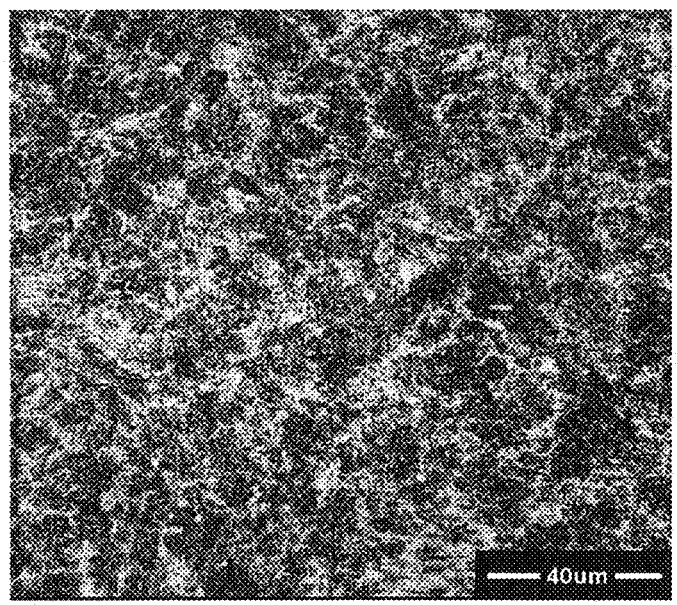

The internal structures of the bearings produced by Inventive and Conventional Examples are shown in FIG. 5. As can be seen from micrographs of FIG. 5, the bearing of Conventional Example (FIG. 5(a)) has tempered martensite as its main internal structure with carbide distributed in the tempered martensite. In contrast, the internal structure of Inventive Example (FIG. 5(b)) is composed of martensite and retained austenite in which substantially no carbide exists. As for retained austenite fractions, the retained austenite fraction of Conventional Example is merely 0.64% but the retained austenite fraction of Inventive Example is 8.0%, which is within the range of retained austenite fraction according to the present invention.

Hardness

The hardness of Conventional Example is compared with that of Inventive Example. While Conventional Example has hardness 60.2HRC, Inventive Example has hardness on the order of 62HRC. This shows that the hardness of Inventive Example is the same as or superior to that of Conventional Example.

Accordingly, it is appreciated that the rolling fatigue lifetime of bearing steel can be increased by high hardness when bearings are produced according to the manufacturing method of the present invention.

Observation of Effects of Soaking

Figure 6:
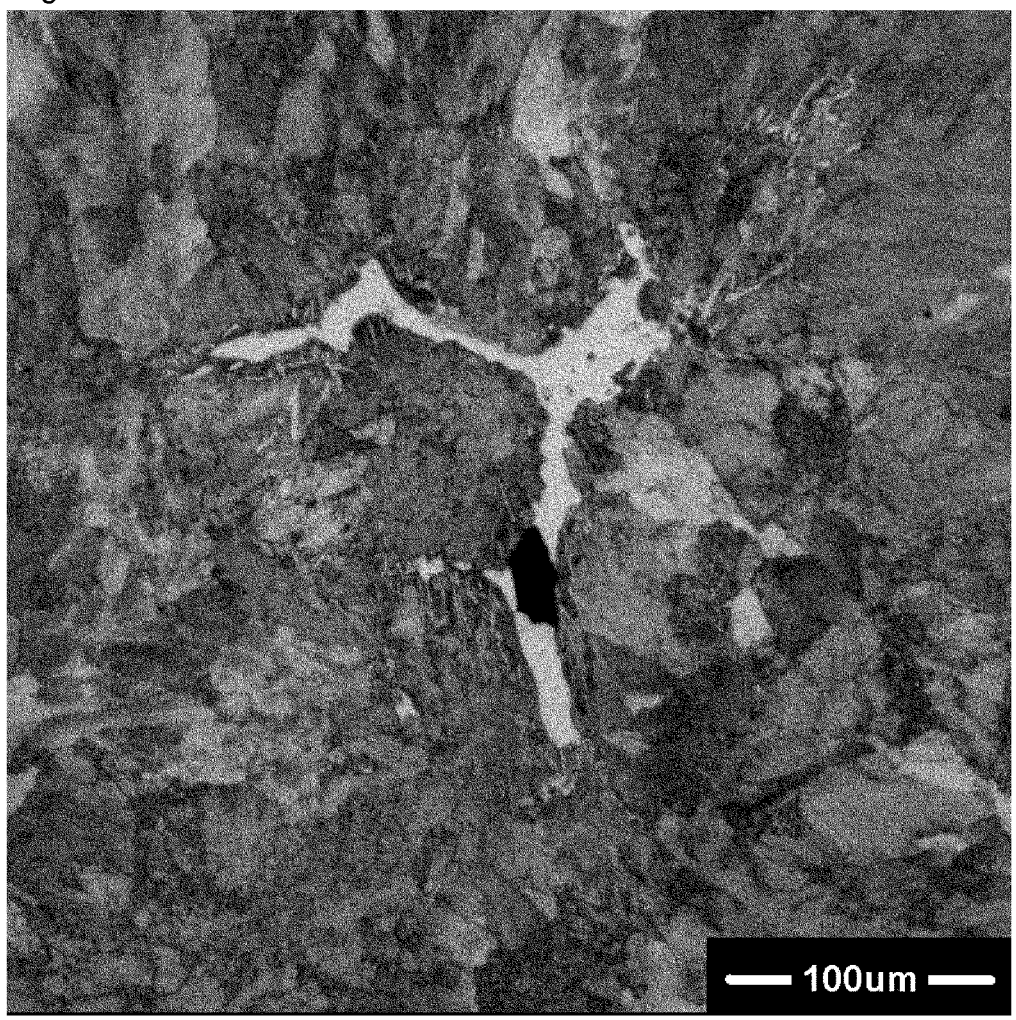
FIG. 6 is a micrograph showing coarse carbide formed due to the center segregation in a bloom used in an embodiment of the present invention.
Figure 7A:
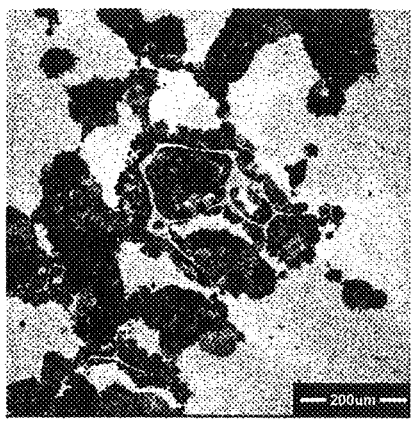
FIGS. 7 (*a*) to (*d*) are a micrographs showing internal structures according to various different soaking conditions.
Figure 7B:
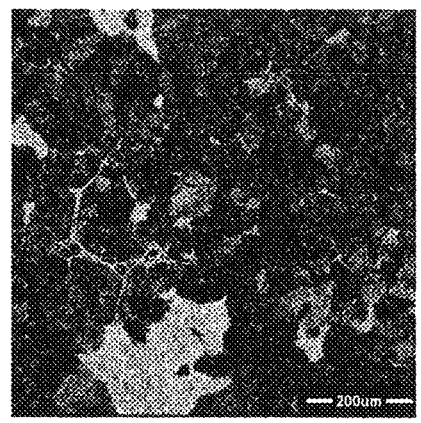
Figure 7C:
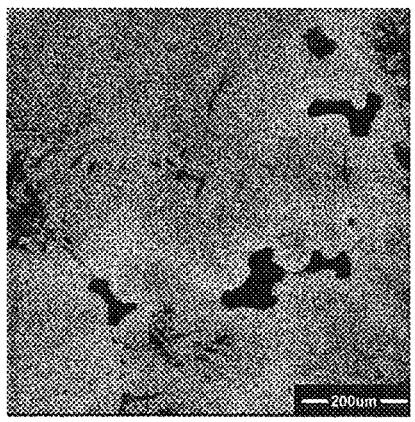
Figure 7D:
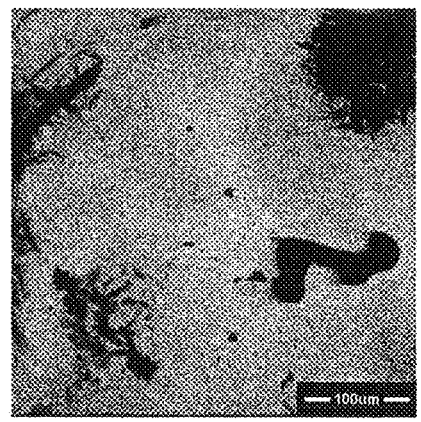

Specimens having a 20 mm×20 mm×20 mm size were extracted from the central portion of a continuous cast bloom having a 300 mm×400 mm sectional area. The bloom had a tundish composition of Fe—0.972%C—1.71%Si—0.349%Mn—0.019%P—0.009%S—0.032%Al—1.46Cr—0.051Ni—0.009Cu—0.005Ti—0.0009O. FIG. 6 is a micrograph showing coarse carbide formed inside the bloom.

From the table above, it can be understood that carbide cannot be completely removed irrespective of temperature when the soaking was performed for 0.5 hour. When soaking was performed for 1 hour, a complete soaking effect was not obtained due to the residue of a certain amount of coarse carbide at heat treatment temperatures 1190° C. and 1200° C. In other temperatures, sufficient treatment effects were obtained since a slight amount of fine carbide remained and substantially no coarse carbide existed.

At treatment times of 1.5 hours or more, it was observed that coarse carbide was completely removed at a temperature 1190° C., which is defined by the present invention.

To support this, FIG. 7 shows micrographs of the specimens according to treatment temperature and time of some of the factors reported in Table 1. FIG. 7(a) represents the result of treatment at 1200° C. for 0.5 hour, and 7(b) represents the result of treatment at 1225° C. for 0.5 hour. FIGS. 7(a) and 7(b) shay that coarse carbide was rarely removed. In contrast, FIG. 7(c) shows the result of treatment at 1200° C. for 1.5 hours in which coarse carbide was almost removed and part of fine carbide remained. The fine carbide rarely has an adverse effect on the fatigue lifetime of bearings compared coarse carbide. FIG. 7(d) shows the result of treatment at 1225° C. for 1 hour in which coarse carbide was also excellently removed.

Accordingly, advantageous effects of the present invention can be appreciated.

The invention claimed is:

1. A steel bearing comprising, by weight, 0.50% to 1.20% carbon, 1.0% to 2.0% silicon, 0.20% to 1.00% manganese, 1.30% to 1.60% chromium, and up to 0.025% phosphorous, up to 0.025% sulfur, and 12 ppm or less of oxygen as impurities, wherein the steel has a microstructure comprising martensite and retained austenite, and the martensite contains no carbides, except for spheroidized carbides.

2. The bearing of claim 1, wherein the retained austenite comprises an area fraction from 5% to 15%.

3. The bearing of claim 1, having a surface and a central portion comprising martensite and retained austenite.

4. A steel wire rod for bearings for quenching and partitioning, comprising: by weight, 0.50% to 1.20% carbon, 1.0% to 2.0% silicon, 0.20% to 1.00% manganese, 1.30% to 1.60% chromium and us to 0.025% phosphorous, up to 0.025% sulfur, and 12 ppm or less of oxygen as impurities, wherein coarse carbides formed due to center segregation during casting are removed.

5. The steel wire rod for bearings of claim 4, further comprising at least one element selected from the group consisting of, by weight, up to 0.1% aluminum, up to 1.0% nickel and up to 1.0% copper.

* * * * *

UNITED STATES PATENT AND TRADEMARK OFFICE
CERTIFICATE OF CORRECTION

PATENT NO.        : 9,593,389 B2
APPLICATION NO.   : 12/747032
DATED             : March 14, 2017
INVENTOR(S)       : Kwan-Ho Kim It is certified that error appears in the above-identified patent and that said Letters Patent is hereby corrected as shown below:

In the Claims

Column 14, Line 58, Claim 1, delete "austenite," and insert -- austenite --

Column 14, Line 67, Claim 4, delete "chromium and us" and insert -- chromium, and up --

Signed and Sealed this
Second Day of May, 2017

Michelle K. Lee
*Director of the United States Patent and Trademark Office*